(12) United States Patent
Aweya et al.

(10) Patent No.: US 7,231,445 B1
(45) Date of Patent: Jun. 12, 2007

(54) TECHNIQUE FOR ADAPTIVELY DISTRIBUTING WEB SERVER REQUESTS

(75) Inventors: James Aweya, Neapean (CA); Michel Ouellette, Rockland (CA); Delfin Y. Montuno, Neapean (CA); Bernard J. Doray, Neapean (CA); Kent E. Felske, Kanata (CA)

(73) Assignee: Nortel Networks Limited, Montreal (CA)

( * ) Notice: Subject to any disclaimer, the term of this patent is extended or adjusted under 35 U.S.C. 154(b) by 698 days.

(21) Appl. No.: 09/713,319

(22) Filed: Nov. 16, 2000

(51) Int. Cl.
*G06F 15/173* (2006.01)

(52) U.S. Cl. .................. 709/226; 709/219; 709/220; 709/223; 709/227; 718/105

(58) Field of Classification Search ............... 705/105, 705/203, 223–227; 709/200, 218, 217, 221–225, 709/227, 228, 201; 714/105; 718/105, 106
See application file for complete search history.

(56) References Cited

U.S. PATENT DOCUMENTS

| | | | | |
|---|---|---|---|---|
| 5,898,870 | A * | 4/1999 | Okuda et al. | 718/105 |
| 6,026,425 | A * | 2/2000 | Suguri et al. | 709/223 |
| 6,070,191 | A * | 5/2000 | Narendran et al. | 709/226 |
| 6,175,869 | B1 * | 1/2001 | Ahuja et al. | 709/226 |
| 6,185,601 | B1 * | 2/2001 | Wolff | 709/203 |
| 6,263,368 | B1 * | 7/2001 | Martin | 709/224 |
| 6,279,001 | B1 * | 8/2001 | DeBettencourt et al. | 709/221 |
| 6,314,465 | B1 * | 11/2001 | Paul et al. | 709/226 |
| 6,401,121 | B1 * | 6/2002 | Yoshida et al. | 709/227 |
| 6,442,165 | B1 * | 8/2002 | Sitaraman et al. | 370/395.4 |
| 6,496,823 | B2 * | 12/2002 | Blank et al. | 718/106 |
| 6,560,717 | B1 * | 5/2003 | Scott et al. | 714/4 |
| 6,748,413 | B1 * | 6/2004 | Bournas | 709/223 |

OTHER PUBLICATIONS

Papoulis, Athanasios; Probability, Random Variables and Stochastic Processes, Third Edition, pp. 508-511 and 520-523.*
V. Cardellini, M. Colajanni, and P. S. Yu, "Dynamic Load Balancing on Web Server Systems," *IEEE Internet Computing*, May/Jun. 1999, pp. 28-39.
A. Iyengar, J. Challenger, D. Dias, and P. Dantzig, "High-Performance Web Site Design Techniques," *IEEE Internet Computing*, Mar./Apr. 2000, pp. 17-26.
T. Schroeder, S. Goddard, and B. Ramamurthy. "Scalable Web Server Clustering Technologies," *IEEE Network*, May/Jun. 2000, pp. 38-44.

(Continued)

*Primary Examiner*—Ario Etienne
*Assistant Examiner*—Ramy M Osman
(74) *Attorney, Agent, or Firm*—Hunton & Williams LLP

(57) ABSTRACT

A technique for adaptively distributing a web server request in a system having a plurality of web servers is disclosed. In one embodiment, the technique is realized by first generating a web server request distribution function for each of the plurality of web servers based upon performance measures of each of the plurality of web servers, wherein each of the plurality of web servers is assigned a respective probability range based upon each respective web server request distribution function. A random probability number is then generated for a web server request. The particular probability range encompassing the random probability number is then determined so as to identify the corresponding web server to which the web server request is to be distributed.

25 Claims, 6 Drawing Sheets

OTHER PUBLICATIONS

H. Bryhni, E. Klovning, and O. Kure, "A Comparison of Load Balancing Techniques for Scalable Web Servers," *IEEE Network*, Jul./Aug. 2000, pp. 58-64.

Y. Bakshi, A. Dias, K. Meier-Hellstern, R. Milito, and R. Skoog, "Overload Control in a Distributed System," *Proc 15th Intern. Teletraffic Congress*, Washington, D.C., USA, 1997, pp. 571-582.

M. Castro, M. Dwyer, and M. Rumsewicz, "Load Balancing and Control for Distributed World Wide Web Servers," *Proc. 1999 IEEE Intern. Conf. On Control Applications*, Hawaii, USA, Aug. 22-27, 1999, pp. 1614-1618.

* cited by examiner

TECHNIQUE FOR ADAPTIVELY DISTRIBUTING WEB SERVER REQUESTS

CROSS-REFERENCE TO RELATED APPLICATIONS

This patent application is related to U.S. patent application Ser. No. 09/713,293 and U.S. patent application Ser. No. 09/713,292, both filed concurrently herewith and both hereby incorporated by reference herein in their entirety.

FIELD OF THE INVENTION

The present invention relates generally to load balancing in web server systems and, more particularly, to a technique for adaptively distributing a web server request in a system having a plurality of web servers.

BACKGROUND OF THE INVENTION

With the acceptance and growth in deployment of web technology, the overall complexity of managing content, networks, and applications is expanding rapidly. There is an ever-growing breadth of devices to manage and content/applications to deploy as businesses look to leverage the expanding web market. In addition, while business use of the Internet started out conservatively, it is rapidly growing into a sophisticated array of e-commerce and content-personalization applications for consumers and businesses alike. The Internet has created a new medium for commerce, one that allows a widespread group of customers to find products and services that are of interest to them. The medium has created a tremendous demand for creative web services to enable advertising, distribution of information, e-commerce, and online transactions of various kinds.

Businesses using the web are developing new models to handle the volumes of web traffic that is created from these new services. These models are typically provided by web servers accessed via web browsers (e.g., Netscape, Explorer). Web switches are being used to help businesses and other content providers serve the needs of their clients. These switches delve deep into the network packets to determine not just what destination was intended, but also what application is being run, and what kind of transaction is being requested within the application. This information can then be used to make intelligent decisions about how to forward this traffic.

As Internet sites begin to handle more traffic and support more services, availability and fault tolerance becomes a critical need. Every transaction and user interaction must be reliable to maintain optimal server quality of service. To address these needs and prevent overload to one specific server, sites often replicate data across an array of servers, or a server farm. But as more servers are deployed it becomes costly, difficult to manage, and provide assurance that one server will not become overloaded, provide incorrect responses, or outright fail. This has created the need for more intelligent systems that can manage incoming traffic—a function known as load balancing (see V. Cardellini, M. Colajanni, and P. S. Yu, "Dynamic Load Balancing on Web-Server Systems," *IEEE Internet Computing*, pp. 28-39, May/June 1999; A. Iyengar, J. Challenger, D. Dias, and P. Dantzig, "High-Performance Web Site Design Techniques," *IEEE Internet Computing*, pp. 17-26, March/April 2000; T. Schroeder, S. Goddard, and B. Ramamurthy, "Scalable Web Server Clustering Technologies," *IEEE Network*, pp. 38-44, May/June 2000; and H. Bryhni, E. Klovning, and O. Kure, "A Comparison of Load Balancing Techniques for Scalable Web Servers," *IEEE Network*, pp. 58-64, July/August 2000). In this type of scenario, traffic can be dynamically distributed across a group of servers running a common application, while making the group appear as one server to the network. This approach allows the traffic to be distributed more efficiently, offering greater economies of scale, and providing significantly greater fault tolerance. A distributed web server system may also provide better reliability since appropriate load balancing algorithms can facilitate fault resilience with graceful degradation of performance as servers leave the system due to failure or preventive maintenance. A distributed web server system also makes it possible to add new machines without interrupting service. Load balancing systems monitor the health of these servers and make decisions on where to route traffic to optimize performance and availability. This ensures users will be connected to the most available server, providing excellent and predictable quality of service to the end-user.

Service interruptions can be costly with today's web applications, and can occur in many ways. Hardware and software failures are common, and operating system and applications may simply stop responding. Content failure (e.g., Object Not Found) or incorrect data can be infuriating to users. And finally, heavy traffic and network and/or server congestion/failure can easily limit site availability. Load balancing systems must be designed to guarantee availability despite these interruptions. Using a solution that is not geared toward providing high availability does not maximize the return on investment for Internet and Intranet connectivity and server system infrastructure.

The techniques traditionally used for load balancing of web servers are mainly round-robin based schemes and have a shortcoming of the inability to adjust to actual resource usage at the web servers. A round-robin algorithm rotates through a list of several server addresses, any one of which could be mapped to a client request. Because such a round-robin algorithm distributes traffic to servers in a predetermined cyclical pattern, it treats all servers as equal, regardless of the number of connections or the response times of the servers. This method for load balancing has several limitations in a server farm made of multiple servers of different capacities. There is a level of system bias resulting from the rotation, which creates unequal and highly variable load distribution among individual servers. The result is that traffic is not being sent to the server that could most efficiently handle the load. A round-robin algorithm also presents an availability problem because this method has no knowledge of the status of the server, software, or application. It does not take into account the workload on the servers, resulting in hot spots. Also, it has no awareness of the availability of the servers. If a server crashes or is removed, a round-robin algorithm continues to send client requests to that server and clients receive a "server not available" message.

A weighted round-robin load balancing scheme is similar to the aforementioned round-robin scheme, but each server in the application group using a weighted round-robin algorithm is assigned a static weight based on some view of the capacity of each server. Servers are presented client requests in proportion to their weighting.

With an ineffective load, balancing scheme, load imbalances among web servers can cause local overloads even when the system has available capacity. Lower performing servers receive excessive requests while higher performance servers are underutilized. The possibility of more frequent software and hardware upgrades in a distributed web server system implies that load control must function in a continuously changing environment. As discussed above, performance and high availability have become critical at web sites that receive large number of client requests.

Because of the above limitations of the traditional load balancing methods, newer techniques need to be implemented to not only solve the load balancing issue associated with the round-robin schemes, but also to provide more scalable and higher availability solutions while providing mechanisms for server management. Thus, it would be desirable to provide a technique for adaptively distributing a web server request in a system having a plurality of web servers which overcomes the above-described inadequacies and shortcomings of the traditional load balancing methods.

SUMMARY OF THE INVENTION

According to the present invention, a technique for adaptively distributing a web server request in a system having a plurality of web servers is provided. In one embodiment, the technique is realized by first generating a web server request distribution function for each of the plurality of web servers based upon performance measures of each of the plurality of web servers, wherein each of the plurality of web servers is assigned a respective probability range based upon each respective web server request distribution function. A random probability number, which typically has a value ranging from 0 to 1, is then generated for a web server request. The particular probability range encompassing the random probability number is then determined so as to identify the corresponding web server to which the web server request is to be distributed.

The performance measures of each of the plurality of web servers may include, for example, any one or more of a web server processor utilization, a web server queue length, a web server memory utilization, a web server response time, a number of web server sessions, and a number of web server connections. Also, the performance measures of each of the plurality of web servers are beneficially weighted.

In accordance with other aspects of the present invention, the web server request distribution function for each of the plurality of web servers may be beneficially based on recursive filtering functions of the performance measures of each of the plurality of web servers. Alternatively, the web server request distribution function for each of the plurality of web servers is based on tracking functions of the performance measures of each of the plurality of web servers.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 1:
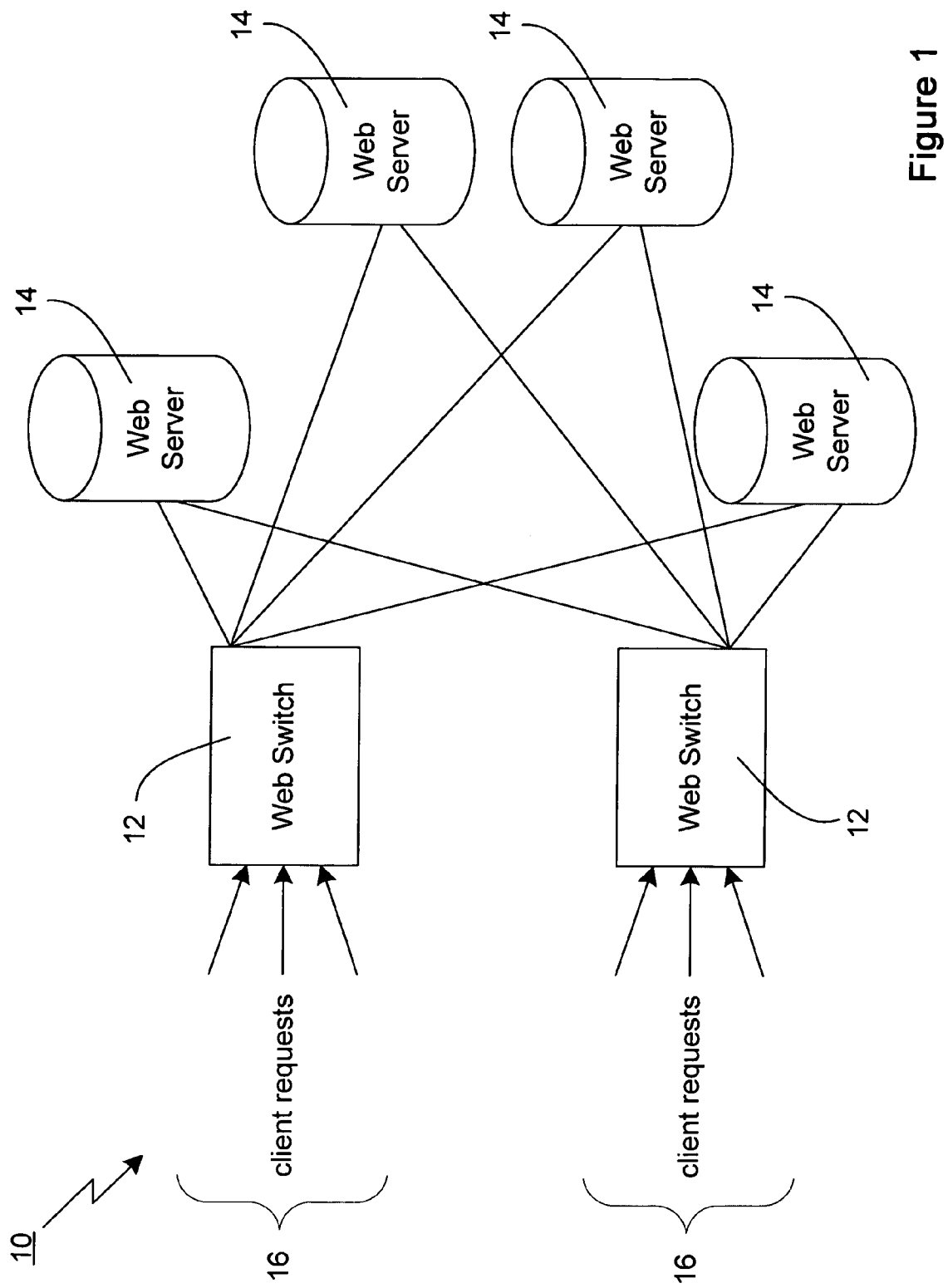
FIG. 1 shows a web server system for supporting a new client request admission control and distribution scheme in accordance with the present invention.

Referring to FIG. 1, there is shown a web server system 10 for supporting a new client request admission control and distribution scheme in accordance with the present invention. The web server system 10 comprises a plurality of web switches 12 and a plurality of web servers 14. The web switches 12 interface with a network (not shown) and receive client requests 16 destined for the web servers 14. The web servers 14 may differ in their internal configuration and processing power.

The incoming client requests 16 are examined by the web switches 12 to determine whether they relate to an existing "session" between a client (not shown) and the web server 14. A session is said to exist between the client and the web server 14 if the client has recently interacted with the web server 14 (sessions can be aged out using timeouts).

If a client request 16 belongs to an existing session, it is immediately forwarded to the web server 14 handling that session. Otherwise, the client request 16 is passed to an admission control process in the web switch 12. The admission control process determines, based on periodic load measurements provided by the web servers 14, whether there is sufficient capacity to service a new session. If not, the client request is rejected (or queued until sufficient capacity is available or redirected to another site). Otherwise, the client request is passed to a load balancing or request distribution process. The new client request distribution process determines, based on the same periodic load measurements, which web server 14 will be assigned to handle the new session.

The web servers 14 periodically send server health status information to the web switches 12. The web switches 12 can also periodically poll the web servers 14 for health status information (processor utilization, available memory, queue lengths, response times, number of connections or sessions, etc.).

Figure 2:
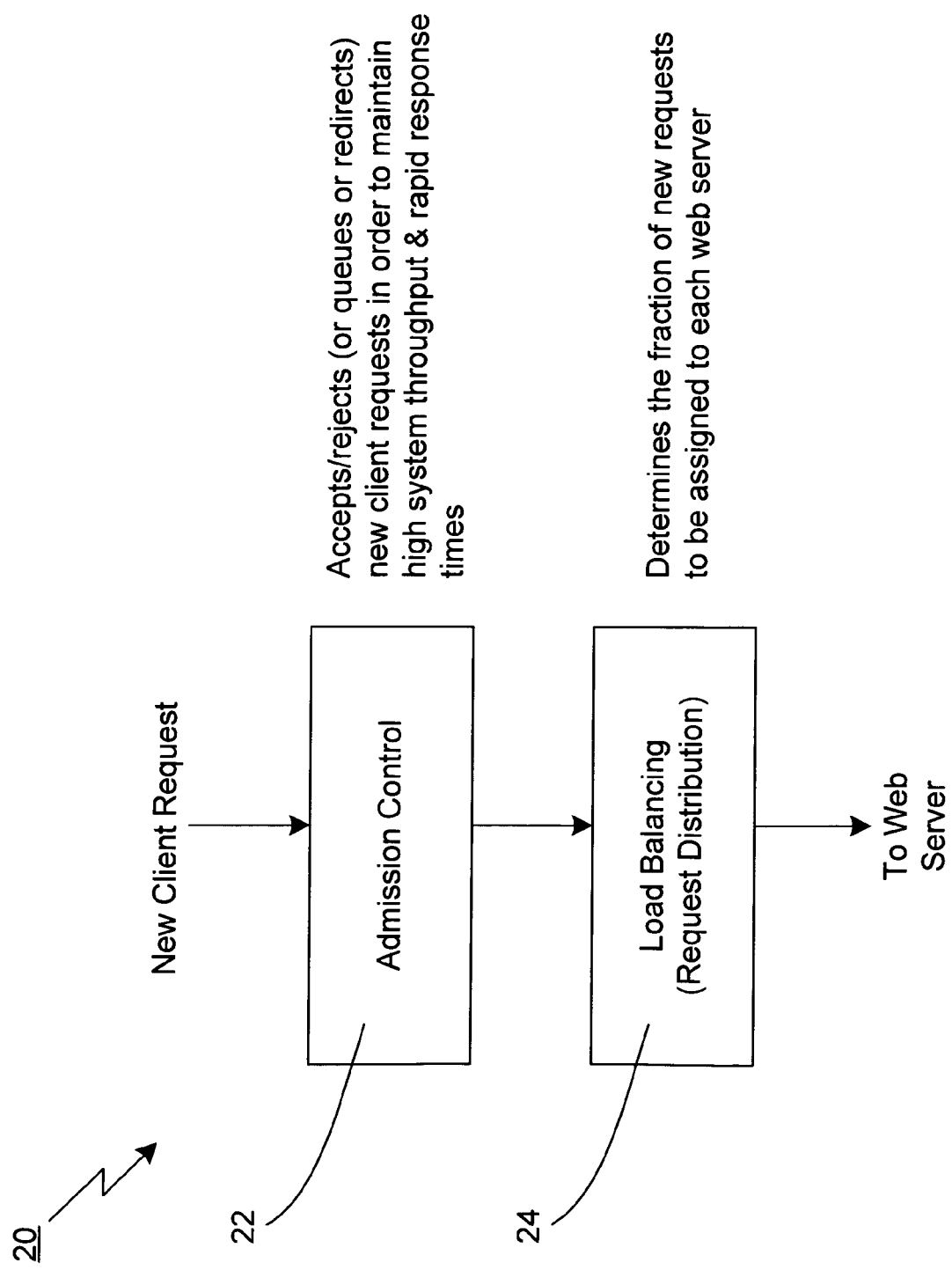
FIG. 2 shows a flowchart detailing the process steps associated with a new client request admission control and distribution scheme in accordance with the present invention.

Referring to FIG. 2, there is shown a flowchart 20 detailing the process steps associated with a new client request admission control and distribution scheme in accordance with the present invention. More particularly, the flowchart 20 includes an admission control process 22 and a load balancing or request distribution process 24. The admission control process 22 is responsible for controlling the rate at which new client requests 16 are accepted for processing by the web servers 14. The aim is to ensure that all client requests 16 accepted for processing by the web servers 14 are processed in an acceptable period of time (i.e., receive rapid response). The admission control process 22 monitors the resource usage of the web servers 14 and throttles new incoming requests 16 when the available web server resources are running low.

The load balancing or request distribution process 24 is responsible for spreading or distributing new incoming requests 16 across all web servers 14 in the web server system 10 that can process the requests 16. By distributing the requests 16 across a number of web servers 14 in proportion to their available capacity, the load balancing or request distribution process 24 attempts to ensure that no web server 14 is offered traffic beyond its capacity while others are running below capacity. Traffic is directed to the web server 14 able to best handle it. This ensures that user response times are minimized when the total offered traffic is less than the total capacity of all web servers 14 in the web server system 10.

It should be noted that the load balancing or request distribution process 24 by itself does not guarantee rapid response and user quality of service. This is the job of the admission control process 22. In comparison, most web server systems implement only load balancing; no admission control.

From the perspective of providing services over the Internet, a major problem is contention for server resources. The delay perceived by an end user (client) of the Internet is a function of server response delay and network delay (e.g., from routers, switches), wherein the latter is the more prominent bottleneck in most cases (but this is likely to change with the introduction of optical networks and multi-gigabit routers and switches). Still, a server's response time to a client request 16 may become unacceptably high, far exceeding network propagation and congestion delays, when servicing a large number of incoming requests 16. This is because as traffic increases, web servers 14 are only able to respond to requests 16 promptly until the web server 14 reaches a point at which it stops responding to any requests 16. The traditional solution to the contention problem, therefore, is to add more web servers 14 in a server farm if the service provider can afford the cost.

With the admission control process 22, users once connected always experience acceptable response times and receive the desired quality of service. Also, the web servers 14 never receive the "last connection" that causes all other existing connections to slow down. Further, the admission control process 22 ensures that throughput is maintained at the highest possible level by controlling traffic to the web servers 14 when the servers' resources are approaching exhaustion. By controlling traffic before the servers' resources are exhausted, the chances of server breakdown are minimized, and hence system sanity and graceful degradation, in the worst case, are guaranteed. Also, if the admission control process 22 allows a user access to a web server 14, the user will receive continuing priority access to server resources over new users. This ensures that the delay in moving from web page to web page on the web server 14 is minimized, thereby ensuring the service a user perceives is maintained at an acceptable level.

Figure 3:
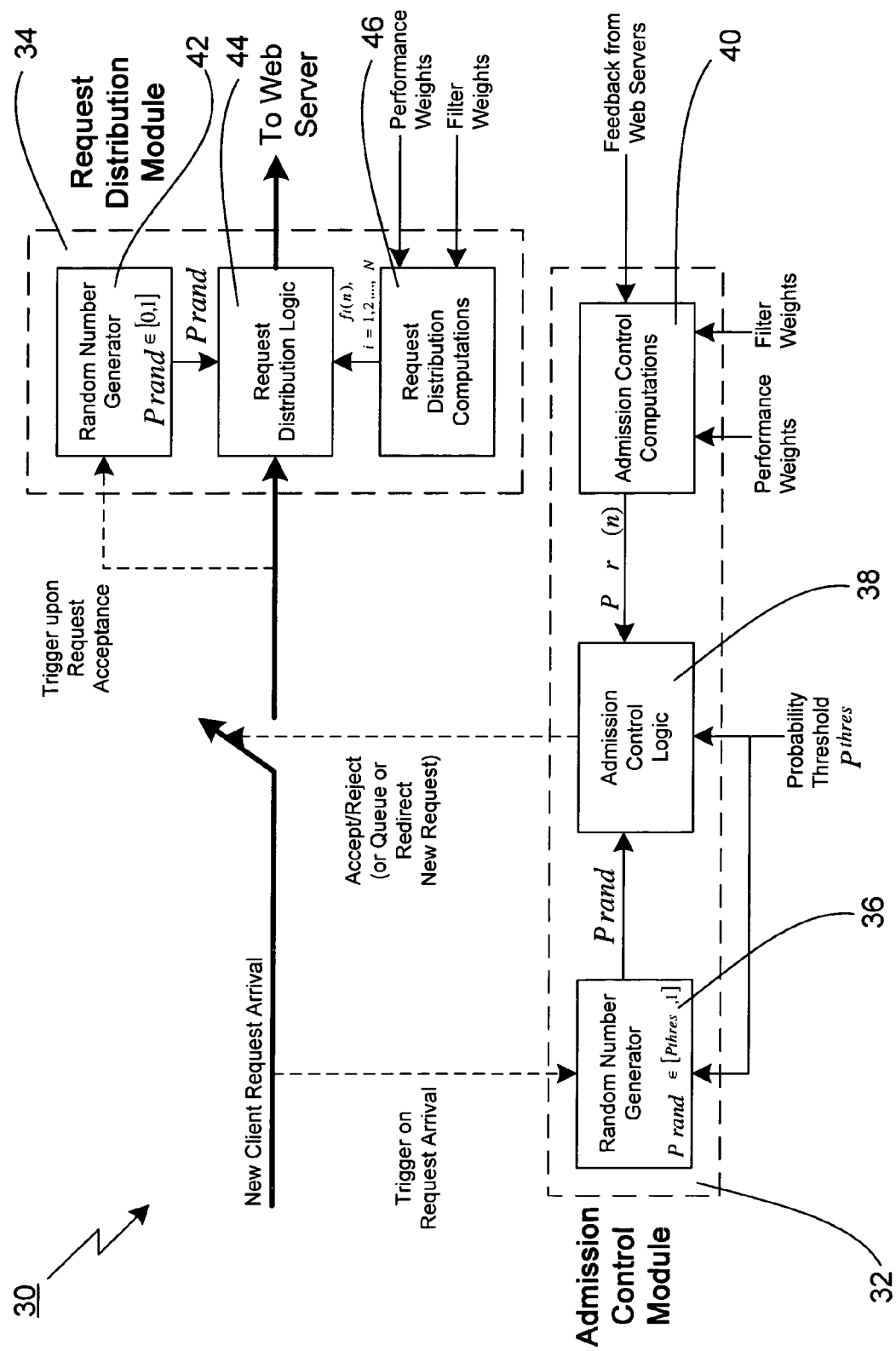
FIG. 3 shows a functional block diagram of a new client request admission control and distribution system in accordance with the present invention.

Referring to FIG. 3, there is shown a functional block diagram of a new client request admission control and distribution system 30 in accordance with the present invention. The system 30, which is typically located within a web switch 12, comprises an admission control module 32 and a request distribution module 34. The admission control module 32 comprises a random number generator 36, admission control logic 38, and admission control computations 40.

The request distribution module 34 comprises a random number generator 42, request distribution logic 44, and request distribution computations 46.

The admission control computations 40 generate a probability that a new client request 16 will be rejected based upon performance weights, filter weights, and feedback from web servers 14. That is, define $p_r(n)=1-p_a(n)$ as the probability of rejecting a new client request 16 at sampling interval $n\Delta t$, $n=1,2,\ldots$, wherein $p_a(n)$ is the probability of accepting the new client request 16. The admission control computations 40 use performance measures of the web servers 14 (e.g., processor utilization, queue lengths, memory utilization, number of connections, etc.) as drivers for adaptively computing the new client request rejection probability function, $p_r(n)$. Every $\Delta t$ sec, the web switch 12 receives from the web servers 14 (through unsolicited feedback from the web servers 14 or polling by the web switch 12) reports of their current performance levels. For example, let $\rho_i(n)$ and $q_i(n)$ denote performance measures of the ith web server 14 ($i=1, 2, \ldots, N$) at sampling (or measurement) interval $n\Delta t$. Since the performance measures (e.g., processor utilization, etc.) may vary widely with time, it is desirable to filter out the swings while retaining information about a trend. For this purpose, exponentially weighted moving average (EWMA) filters are used with filter gains $\alpha$ and $\beta$, such that:

$$\rho(n) = (1-\alpha)\rho(n-1) + \frac{\alpha}{N}\sum_{i=1}^{N}\rho_i(n), \ 0 < \alpha < 1$$

$$q(n) = (1-\beta)q(n-1) + \frac{\beta}{N}\sum_{i=1}^{N}q_i(n), \ 0 < \beta < 1$$

The above recursions involve averaging across the web servers 14. The parameters $\rho_i(n)$ and $q_i(n)$ could each be normalized such that $0 \leq \rho_i(n) \leq 1$ and $0 \leq q_i(n) \leq 1$.

Using relative weights $w_p$ and $w_q$, an overall metric $M(n)$ is then computed as follows:

$$M(n) = w_p \cdot \rho(n) + w_q \cdot q(n), w_p + w_q = 1$$

wherein $w_p$ and $w_q$ are weights that attach relative importance to each performance metric in the admission control process.

At this point it should be noted that, although only two performance measures have been used in the above calculations, any number of performance measures (one or more) can be used.

Given performance targets $\rho_{tar}$ and $q_{tar}$, the goal is to prevent the web servers 14 from exceeding over long periods these performance targets. An overall performance target is defined as follows:

$$T_{tar} = w_p \cdot \rho_{tar} + w_q \cdot q_{tar}$$

To achieve this goal, the fraction of new client requests 16 to be accepted/rejected during the measurement period $n\Delta t$, $n=1,2,\ldots$, is adjusted according to the following recursion:

$$p_a(n) = 1 - p_r(n) = \min\left\{1, p_a(n-1) \cdot \frac{T_{tar}}{M(n)}\right\}$$

The idea is to increase the fraction of accepted new client requests 16 whenever the smoothed performance measures of the web servers 14 are below their targets, and to decrease it when above their targets.

The admission control process is not restricted to the above function only. For example, the following function can alternatively be defined:

$$p_a(n) = 1 - p_r(n) = \min\left\{1, \max\left\{0, p_a(n-1)\left[1 + \frac{T_{tar} - M(n)}{\max\{T_{tar}, M(n)\}}\right]\right\}\right\}$$

where $\max\{T_{tar}, M(n)\}$ serves as a normalization term.

Note that each performance target is computed by taking the average across all servers as follows:

$$\rho_{tar} = \frac{1}{N}\sum_{i=1}^{N}\rho_{tar,i}, \quad q_{tar} = \frac{1}{N}\sum_{i=1}^{N}q_{tar,i}$$

wherein $\rho_{tar,i}$ and $q_{tar,i}$ are the performance targets of web server i. The parameters $\rho_{tar,i}$ and $q_{tar,i}$ could each be normalized such that $0 \leq \rho_{tar,i} \leq 1$ and $0 \leq q_{tar,i} \leq 1$.

If there is more than one web switch 12 serving a web server farm, each web switch 12 acts autonomously. An instance of an admission control mechanism could be configured for each service type in the server farm. Note that the measurements received by the web switch 12 from the web servers 14 are staggered due to the different network communication delays from the web servers 14 to the web switch 12.

Each web server i transmits a load vector, $LV_i$, periodically to (or is polled by) the web switch 12, wherein:

$$LV_i = [\rho_i, q_i], i=1, 2, \ldots, N$$

When a new web server 14 is added, target load vectors are only sent once to the web switch 12, or alternatively are configured at the web switch 12, as follows:

$$LV_{tar,i} = [\rho_{tar,i}, q_{tar,i}], i=1, 2, \ldots, N$$

The admission control logic 38 uses the new client request rejection probability function, $p_r(n)$, generated by the admission control computations 40 to determine whether a new client request 16 should be accepted or rejected. In addition, the admission control logic 38 also uses a predetermined rejection probability threshold, $p_{thres}$, which is generated based on a desired system performance (e.g., $p_{thres} = 0.02$), and a random probability number, $p_{rand}$, which is generated by the random number generator 32 when a new client request 16 arrives and on condition that the predetermined rejection probability threshold, $p_{thres}$, is less than or equal to the request rejection probability function, $p_r(n)$. It should be noted that the rejection probability threshold, $p_{thres}$, which is always greater than or equal to zero, allows a system manager to set thresholds for different system performances below which admission control is not triggered.

The request distribution module 34 allocates requests across web servers 14, recognizing overloaded web servers 14 and sending client requests 16 to less burdened web servers 14. More particularly, the request distribution computations 46 generate a new client request distribution function, $f_i(n)$, based upon performance weights, filter weights, and feedback from web servers 14. Again, let $\rho_i(n)$ and $q_i(n)$ denote performance measures (e.g., processor utilization, memory utilization, etc.) of the ith web server at sampling (or measurement) interval $n\Delta t$, $n=1,2,\ldots$, and then let $\rho_{max}(n)$ and $q_{max}(n)$ denote the largest of each performance measure, respectively. Also, let $\rho_{av}(n)$ and $q_{av}(n)$ be the average of each performance measure across all web servers, respectively, at sampling time n. The following recursive filtering functions can be defined for each web server i (i=1, 2, ..., N) at time n:

$$\hat{f}_{i,p}(n) = (1-\eta)\hat{f}_{i,p}(n-1) + \eta\max\left\{0, \frac{\rho_{av}(n) - \rho_i(n)}{\rho_{max}(n)}\right\}, 0 < \eta < 1$$

$$\hat{f}_{i,q}(n) = (1-\mu)\hat{f}_{i,q}(n-1) + \mu\max\left\{0, \frac{q_{av}(n) - q_i(n)}{q_{max}(n)}\right\}, 0 < \mu < 1$$

Alternatively, a tracking function not based on the recursive filtering of the performance measures can be used. For example, the following functions can be defined for performance measures $\rho$ and q:

$$\hat{f}_{i,p}(n) = \max\left\{0, \hat{f}_{i,p}(n-1)\left[1 + \frac{\rho_{tar,i} - \rho_i(n)}{\max\{\rho_{tar,i}, \rho_i(n)\}}\right]\right\}$$

$$\hat{f}_{i,q}(n) = \max\left\{0, \hat{f}_{i,q}(n-1)\left[1 + \frac{q_{tar,i} - q_i(n)}{\max\{q_{tar,i}, q_i(n)\}}\right]\right\}$$

wherein $\max\{\rho_{tar,i}, \rho_i(n)\}$ and $\max\{q_{tar,i}, q_i(n)\}$ are normalization terms.

If $w_\rho$ and $w_q$ are defined as weights for the performance measures $\rho$ and q, respectively, then the overall weighted performance metric for web server i at time n can be defined as:

$$f_i(n) = w_\rho \cdot f_{i,\rho}(n) + w_q \cdot f_{i,q}(n), w_\rho + w_q = 1$$

The new client request distribution function, $f_i(n)$, is then computed as follows:

$$f_i(n) = \frac{\hat{f}_i(n)}{\sum_{j=1}^{N}\hat{f}_j(n)}, i = 1, 2, \ldots, N$$

The above computations require neither that the processors at the web servers 14 be homogeneous nor explicit knowledge of their relative speeds.

Figure 4:
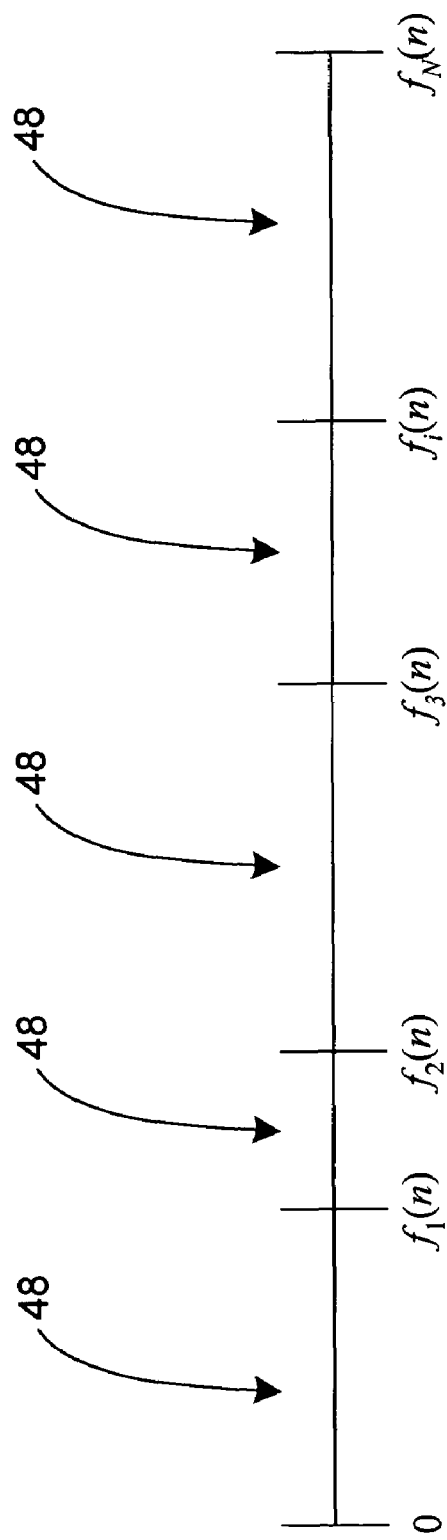
FIG. 4 shows probability ranges for the web servers in the web server system shown in FIG. 1.

Referring to FIG. 4, there are shown probability ranges 48 for web servers 14 (numbered i=1, 2, ..., N) that are constructed using the new client request distribution function, $f_i(n)$, i=1, 2, ..., N. These ranges can be defined as follows:

Web server 1: $[0, f_1(n)]$
Web server 2: $(f_1(n), f_1(n)+f_2(n)]$
Web server 3: $(f_1(n)+f_2(n), f_1(n)+f_2(n)+f_3(n)]$
Web server i:

$$\left(\sum_{k=0}^{i-1}f_k(n), \sum_{k=0}^{i}f_k(n)\right], i = 2, \ldots, N$$

wherein $$f_0(n) = 0 \text{ and } \sum_{k=0}^{N} f_k(n) = 1$$

The request distribution logic 44 uses the new client request distribution function, $f_i(n)$, generated by the request distribution computations 46 to determine where a new client request 16 should be sent. In addition, the request distribution logic 44 also uses a random probability number, $p_{rand}$, which is generated by the random number generator 42 whenever a new client request 16 has been accepted.

Figure 5:
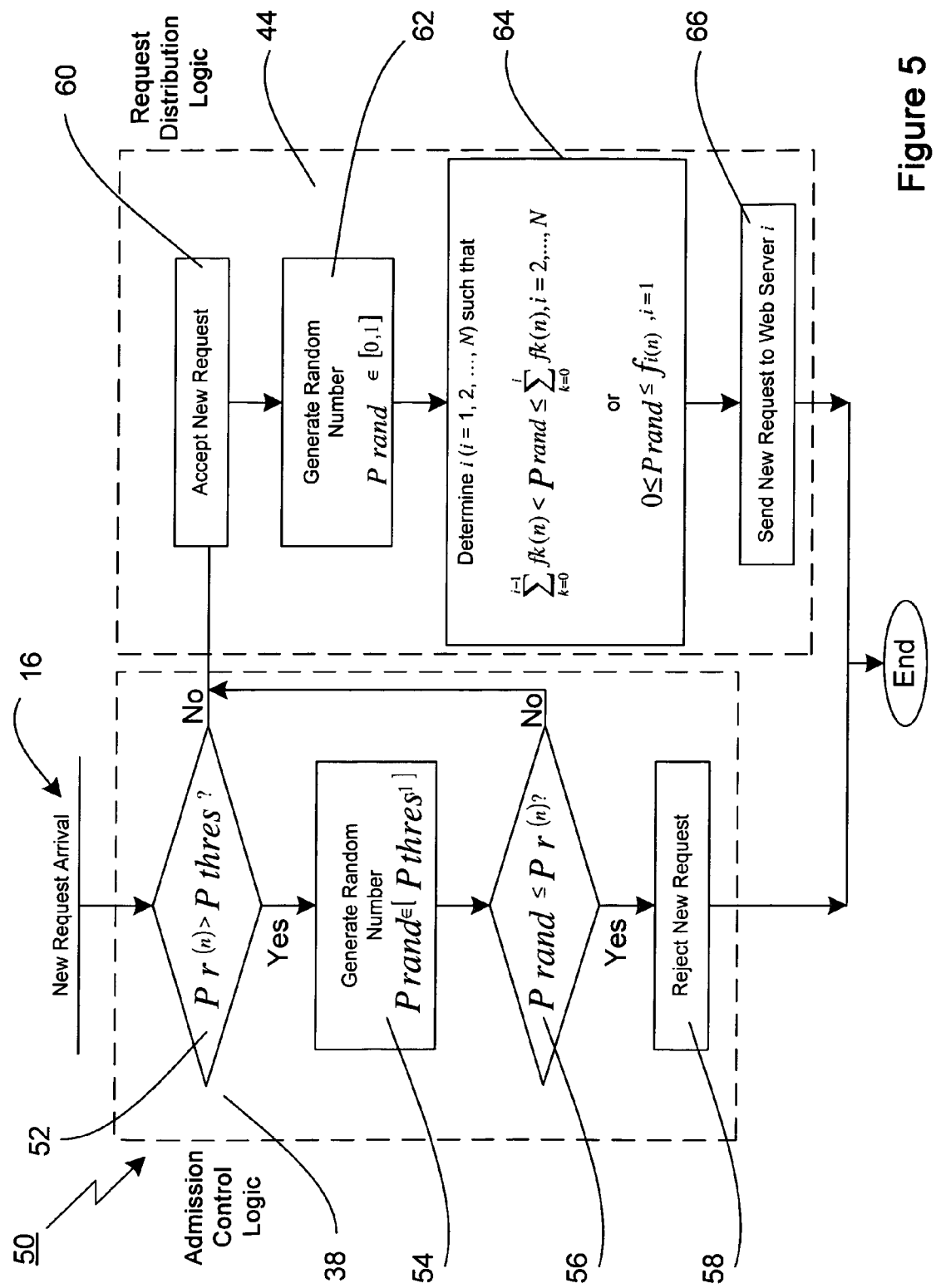
FIG. 5 shows a flowchart illustrating new client request admission control and distribution processes in accordance with the present invention.

Referring to FIG. 5, there is shown a flowchart 50 illustrating new client request admission control and distribution processes in accordance with the present invention. More particularly, the flowchart 50 details the admission control logic 38 and the request distribution logic 44. In the admission control logic 38, when a new client request 16 arrives, the rejection probability, $p_r(n)$, is compared to the rejection probability threshold, $p_{thres}$, in a first step 52. If the rejection probability, $p_r(n)$, is greater than rejection probability threshold, $p_{thres}$, then a first random probability number, $p_{rand}$, is generated in step 54, wherein the first random probability number, $p_{rand}$, is defined by $p_{rand} \in [p_{thres}, 1]$. Next, the first random probability number, $p_{rand}$, is compared to the rejection probability, $p_r(n)$, in step 56. If the first random probability number, $p_{rand}$, is less than or equal to the rejection probability, $p_r(n)$, then the new client request 16 is rejected in step 58.

However, if the rejection probability, $p_r(n)$, is less than or equal to the rejection probability threshold, $p_{thres}$, or if the first random probability number, $p_{rand}$, is greater than the rejection probability, $p_r(n)$, then the new client request 16 is accepted in step 60. Once the new client request 16 is accepted, a second random probability number, $p_{rand}$, is generated in step 62, wherein the second random probability number, $p_{rand}$, is defined by $p_{rand} \in [0, 1]$. Next, if $$\sum_{k=0}^{i-1} f_k(n) < p_{rand} \le \sum_{k=0}^{i} f_k(n),$$

for i=2, . . . , N or $0 \le p_{rand} \le f_1(n)$ for i=1, then the new client request 16 is sent to web server i, in steps 64 and 66.

Figure 6:
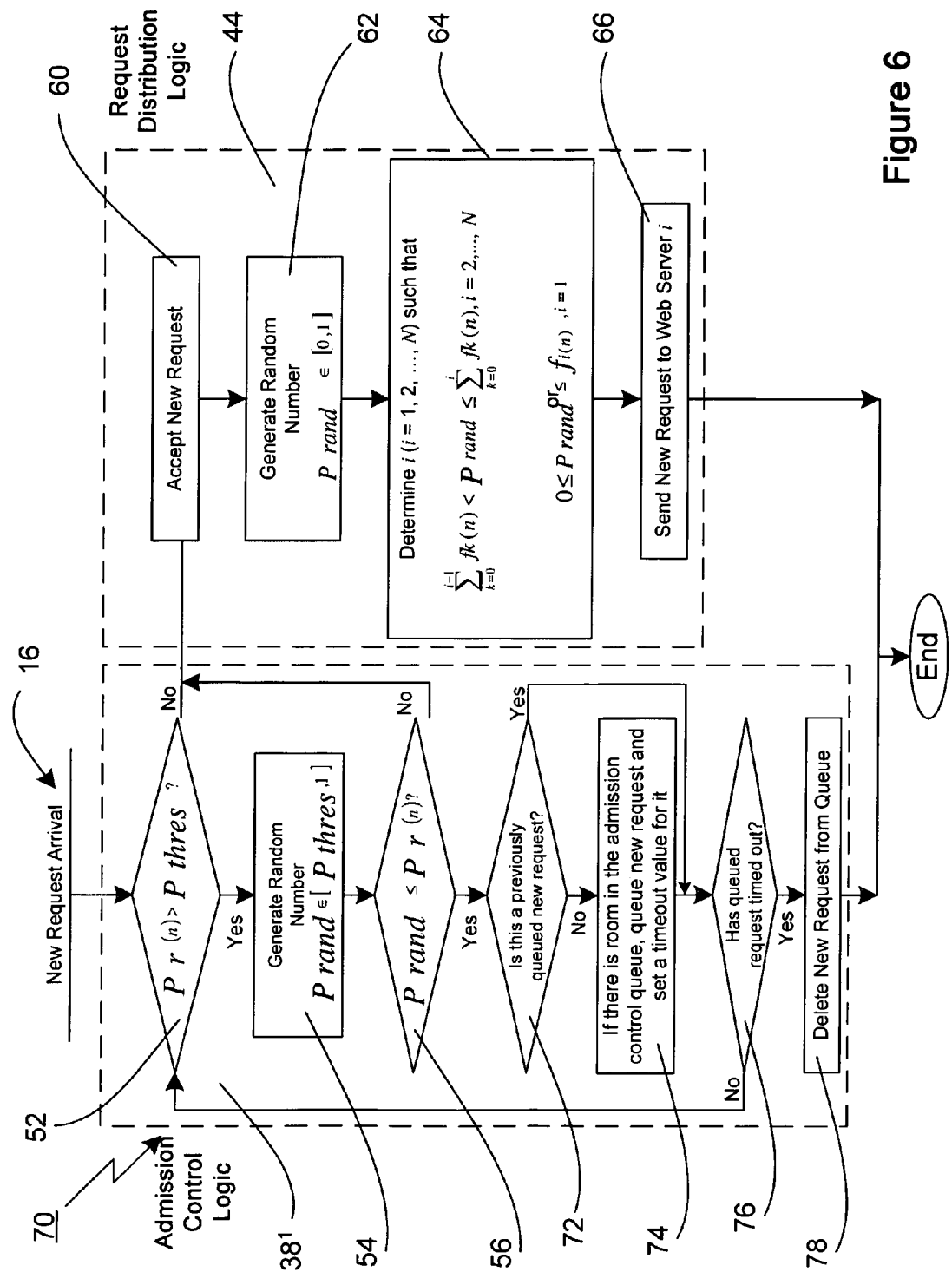
FIG. 6 shows a flowchart illustrating alternative embodiment new client request, admission control and distribution processes in accordance with the present invention.

Referring to FIG. 6, there is shown a flowchart 70 illustrating alternative embodiment new client request admission control and distribution processes in accordance with the present invention. More particularly, the flowchart 70 details an alternative form of the admission control logic 38', wherein the new client request 16 is queued instead of rejected. That is, if the first random probability number, $p_{rand}$, is less than or equal to the rejection probability, $p_r(n)$, then, in step 72, instead of rejecting the new client request 16, a first determination is made as to whether the new client request 16 has previously been queued. If not, then in step 74, if there is room in an admission control queue, the new client request 16 is queued and a timeout value is set for it. Step 74 may be skipped if the new client request 16 has previously been queued. Next, in step 76, a second determination is made as to whether the new client request 16 has timed out. If so, the new client request 16 is deleted from the queue in step 78. If not, the new client request 16 is treated as if it has just arrived and the entire process begins again.

To summarize the embodiments described in FIGS. 5 and 6 in relation to the web server system 10 of FIG. 1, when a new client request 16 arrives at the web server system 10, the receiving web switch 12 decides whether sufficient resources exist in the web server system 10 to process the new client request 16 in a timely fashion. If there are sufficient resources, the new client request 16 is immediately admitted and sent to a web server 14. Once the new client request 16 has been admitted, each subsequent new client request 16 that is related to the session established by the earlier admitted new client request 16 bypasses the admission control process and is immediately sent to the same web server 14. This guarantees that a session, once established, will not be dropped from the web server system 10. This also ensures that state information, if required, is preserved during the session.

If there are insufficient resources in the web server system 10, the admission control process may operate to reject or queue the new client request 16. If queued, the new client request 16 is held until resources become available in the web server system 10 and then the new client request 16 is forwarded to a suitable web server 14, or until it times out. Instead of rejecting or queuing new client requests 16 during overload periods, the admission control process may also redirect new client requests 16 to other web server systems when the present web server system 10 resources are running low.

In the context of the web server system 10, the admission control process checks whether admitting a new client request 16 would reduce the service quality of existing client sessions (or in other words, whether the incoming new client request 16 cannot be adequately served). The admission control process plays a crucial role in ensuring that the web servers 14 meet the "quality of service requirements" of the users.

The fundamental question in relation to web server admission control is whether an admission control process is really necessary in web server systems. For this question, it is noted that there are two ways to increase overall user utility, namely, 1.) increasing web server (farm or cluster) capacity, or 2.) implementing some intelligent traffic management mechanisms. Obviously, if one could cost-effectively over-provision the web server (farm) so that under normal conditions the web server is rarely overloaded, then one might choose to do that rather than include an admission control process in the architecture. However, it is expected that the World Wide Web will see an exponential growth in traffic and leading edge traffic flows with variable usage and unpredictable behavior, such as high quality video or massive real-time data streams. Also, a popular site can be flooded with web browser hits due to some promotional, sporting- or "news-breaking" event. Thus, the tradeoff between cost and benefit for service providers is to either accept a significant new client request rejection rate or to spend big money on over-provisioning the capacity of the server system. This gives rise to a key question of the charging source (i.e., who pays) for the increased capacity needed to over-provision. In this scenario, as e-commerce becomes a highly competitive market, service providers that attempt to over-provision in the place of using an admission control process may not be cost-effective, whereas service providers who gain performance and reliability while keeping costs down will likely gain a competitive edge in the marketplace.

The present invention new client request admission control and distribution scheme dynamically determines the fraction of new client requests 16 that should be admitted into the web server system 10 to ensure that the web servers 14 are not overloaded for extended periods, while at the same time effectively distributing the new client requests 16 that are accepted for processing among the web servers 14. The aim is to control the rate at which new client requests 16 are sent to the web servers 14 so as to ensure rapid response time for each new client request 16 processed, and at the same time make available the full processing capacity of each web server 14 so as to maximize the overall throughput of the distributed web server system 10.

The admission control process adaptively determines the acceptance rate of the new client requests 16 so as to meet the performance requirements of the web servers 14, while the load balancing or new client request distribution process determines the fraction of new client requests 16 to be assigned to each web server 14. Adding the admission control process over and above basic load balancing reduces workload, increases web server performance (faster response to user requests) and maximizes the usefulness of web server arrays.

The present invention new client request admission control and distribution scheme requires no prior knowledge of the relative speeds of the web servers 14, nor the work required to process each incoming new client request 16. In this scheme, the admission control/load balancing processes, which are typically located in a web switch 12, regulate the new client requests 16 that are sent to the web servers 14 using periodic load measurements passed from the web servers 14 to the web switch 12.

At this point it should be noted that the functions associated with the present invention new client request admission control and distribution scheme may be implemented in hardware or software. For example, specific electronic components may be employed in a web switch 12 for implementing the functions associated with the present invention new client request admission control and distribution scheme. Alternatively, a processor operating in accordance with stored instructions may implement the functions associated with the present invention new client request admission control and distribution scheme. If such is the case, it is within the scope of the present invention that such instructions may be transmitted to the web switch 12 via one or more signals.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for adaptively distributing a web server request in a system having a plurality of web servers, the method comprising the steps of:

generating a web server request rejection probability based upon performance measures of each of the plurality of web servers;

admitting a web server request if the web server request rejection probability is less than or equal to a predetermined web server request rejection probability threshold, wherein the web server request is admitted before the web server request is sent or transmitted to a web server;

generating a web server request distribution function for each of the plurality of web servers based upon performance measures of each of the plurality of web servers, each of the plurality of web servers being assigned a respective probability range based upon each respective web server request distribution function, wherein the web server request distribution function for each of the plurality of web servers is based on recursive filtering functions of the performance measures of each of the plurality of web servers, and wherein the recursive filtering functions of the performance measures of each of the plurality of web servers comprises:

$$\hat{f}_{i,p}(n) = (1-\eta)\hat{f}_{i,p}(n-1) + \eta\max\left\{0, \frac{\rho_{av}(n) - \rho_i(n)}{\rho_{\max}(n)}\right\}, 0 < \eta < 1$$

$$\hat{f}_{i,q}(n) = (1-\mu)\hat{f}_{i,q}(n-1) + \mu\max\left\{0, \frac{q_{av}(n) - q_i(n)}{q_{\max}(n)}\right\}, 0 < \mu < 1$$

wherein n represents the sampling time, i represents a web server, $\rho_i(n)$ and $q_i(n)$ represent performance measures of the ith web server at sampling time n, $\rho_{av}(n)$ and $q_{av}(n)$ represent average of performance measures across all web servers, and $\rho_{max}(n)$ and $q_{max}(n)$ represent the largest of each performance measure;

generating a random probability number for the admitted web server request; and determining the particular probability range encompassing the random probability number so as to identify the corresponding web server to which the admitted web server request is to be distributed.

2. The method as defined in claim 1, wherein the random probability number has a value ranging from 0 to 1.

3. The method as defined in claim 1, wherein the performance measures of each of the plurality of web servers are weighted.

4. The method as defined in claim 3, wherein the performance measures of each of the plurality of web servers comprise at least one of a web server processor utilization, a web server queue length, a web server memory utilization, a web server response time, a number of web server sessions, and a number of web server connections.

5. The method of claim 1 further comprising the step of rejecting the web server request if the web server request rejection probability is more than a predetermined web server request rejection probability threshold.

6. The method of claim 5 further comprising the step of queuing the rejected web server request if there is room in an admission control queue.

7. The method of claim 1 wherein the performance measures are provided by each of the plurality of web servers.

8. The method of claim 1 wherein the web server request distribution function for each of the plurality of web servers based upon performance measures of each the plurality of web servers, comprises:

$$f_i(n) = \frac{\hat{f}_i(n)}{\sum_{j=1}^{N} \hat{f}_j(n)}, i = 1, 2, \ldots, N$$

wherein n represents the sampling time, and i represents a web server.

9. The method of claim 1 wherein the web server request rejection probability is defined as $p_r(n)=1-p_a(n)$ at sampling interval $n\Delta t$, $n=1, 2, \ldots$, wherein $p_a(n)$ is probability of accepting the web server request and t is time.

10. The method of claim 1 wherein the web server request is admitted for processing before a web server to which the request is to be delivered to is identified or determined.

11. An apparatus for adaptively distributing a web server request in a system having a plurality of web servers, the apparatus comprising:
   a web server request rejection probability generator for generating a web server request rejection probability based upon performance measures of each of the plurality of web servers;
   admission control logic for admitting a web server request if the web server request rejection probability is less than or equal to a predetermined web server request rejection probability threshold, wherein the web server request is admitted before the web server request is sent or transmitted to a web server;
   a web server request distribution function generator for generating a web server request distribution function for each of the plurality of web servers based upon performance measures of each of the plurality of web servers, each of the plurality of web servers being assigned a respective probability range based upon each respective web server request distribution function, wherein the web server request distribution function for each of the plurality of web servers is based on recursive filtering functions of the performance measures of each of the plurality of web servers, and wherein the recursive filtering functions of the performance measures of each of the plurality of web servers comprises:

$$\hat{f}_{i,p}(n) = (1-\eta)\hat{f}_{i,p}(n-1) + \eta \max\left\{0, \frac{\rho_{av}(n) - \rho_i(n)}{\rho_{max}(n)}\right\}, 0 < \eta < 1$$

$$\hat{f}_{i,q}(n) = (1-\mu)\hat{f}_{i,q}(n-1) + \mu \max\left\{0, \frac{q_{av}(n) - q_i(n)}{q_{max}(n)}\right\}, 0 < \mu < 1$$

wherein n represents the sampling time, i represents a web server, $\rho_i(n)$ and $q_i(n)$ represent performance measures of the ith web server at sampling time n, $\rho_{av}(n)$ and $q_{av}(n)$ represent average of performance measures across all web servers, and $\rho_{max}(n)$ and $q_{max}(n)$ represent the largest of each performance measure;
   a random number generator for generating a random probability number for the admitted web server request; and
   web server request distribution logic for determining the particular probability range encompassing the random probability number so as to identify the corresponding web server to which the admitted web server request is to be distributed.

12. The apparatus as defined in claim 11, wherein the random probability number has a value ranging from 0 to 1.

13. The apparatus as defined in claim 11, wherein the performance measures of each of the plurality of web servers are weighted.

14. The apparatus as defined in claim 13, wherein the performance measures of each of the plurality of web servers comprise at least one of a web server processor utilization, a web server queue length, a web server memory utilization, a web server response time, a number of web server sessions, and a number of web server connections.

15. The apparatus as defined in claim 11, wherein the web server request distribution function for each of the plurality of web servers is based on recursive filtering functions of the performance measures of each of the plurality of web servers.

16. The apparatus as defined in claim 11, wherein the web server request distribution function for each of the plurality of web servers is based on tracking functions of the performance measures of each of the plurality of web servers.

17. The apparatus of claim 11 wherein the web server request is admitted for processing before being delivered to a web server.

18. An article of manufacture for adaptively distributing a web server request in a system having a plurality of web servers, the article of manufacture comprising:
   at least one processor readable medium; and
   instructions stored on the at least one medium;
   wherein the instructions are configured to be readable from the at least one medium by at least one processor and thereby cause the at least one processor to operate so as to:
   generate a web server request rejection probability based upon performance measures of each of the plurality of web servers;
   admit a web server request if the web server request rejection probability is less than or equal to a predetermined web server request rejection probability threshold, wherein the web server request is admitted before the web server request is sent or transmitted to a web server;
   generate a web server request distribution function for each of the plurality of web servers based upon performance measures of each of the plurality of web servers, each of the plurality of web servers being assigned a respective probability range based upon each respective web server request distribution function, wherein the web server request distribution function for each of the plurality of web servers is based on recursive filtering functions of the performance measures of each of the plurality of web servers, and wherein the recursive filtering functions of the performance measures of each of the plurality of web servers comprises:

$$\hat{f}_{i,p}(n) = (1-\eta)\hat{f}_{i,p}(n-1) + \eta \max\left\{0, \frac{\rho_{av}(n) - \rho_i(n)}{\rho_{max}(n)}\right\}, 0 < \eta < 1$$

$$\hat{f}_{i,q}(n) = (1-\mu)\hat{f}_{i,q}(n-1) + \mu \max\left\{0, \frac{q_{av}(n) - q_i(n)}{q_{max}(n)}\right\}, 0 < \mu < 1$$

wherein n represents the sampling time, i represents a web server, $\rho_i(n)$ and $q_i(n)$ represent performance measures of the ith web server at sampling time n, $\rho_{av}(n)$ and $q_{av}(n)$ represent average of performance measures across all web servers, and $\rho_{max}(n)$ and $q_{max}(n)$ represent the largest of each performance measure;
generate a random probability number for admitted web server request; and
determine the particular probability range encompassing the random probability number so as to identify the corresponding web server to which the admitted web server request is to be distributed.

19. The article of manufacture as defined in claim 18, wherein the random probability number has a value ranging from 0 to 1.

20. The article of manufacture as defined in claim 18, wherein the performance measures of each of the plurality of web servers are weighted.

21. The article of manufacture as defined in claim 20, wherein the performance measures of each of the plurality of web servers comprise at least one of a web server processor utilization, a web server queue length, a web server memory utilization, a web server response time, a number of web server sessions, and a number of web server connections.

22. The article of manufacture as defined in claim 18, wherein the web server request distribution function for each of the plurality of web servers is based on recursive filtering functions of the performance measures of each of the plurality of web servers.

23. The article of manufacture as defined in claim 18, wherein the web server request distribution function for each of the plurality of web servers is based on tracking functions of the performance measures of each of the plurality of web servers.

24. A method for adaptively distributing a web server request in a system having a plurality of web servers, the method comprising the steps of:
generating a web server request rejection probability based upon performance measures of each of the plurality of web servers;
admitting a web server request if the web server request rejection probability is less than or equal to a predetermined web server request rejection probability threshold, wherein the web server request is admitted before the web server request is sent or transmitted to a web server;
generating a web server request distribution function for each of the plurality of web servers based upon performance measures of each of the plurality of web servers, each of the plurality of web servers being assigned a respective probability range based upon each respective web server request distribution function, wherein the web server request distribution function for each of the plurality of web servers is based on tracking functions of the performance measures of each of the plurality of web servers, and wherein the tracking functions of the performance measures of each of the plurality of web servers comprises:

$$\hat{f}_{i,p}(n) = \max\left\{0, \hat{f}_{i,p}(n-1)\left[1 + \frac{\rho_{tar,i} - \rho_i(n)}{\max\{\rho_{tar,i}, \rho_i(n)\}}\right]\right\}$$

$$\hat{f}_{i,q}(n) = \max\left\{0, \hat{f}_{i,q}(n-1)\left[1 + \frac{q_{tar,i} - q_i(n)}{\max\{q_{tar,i}, q_i(n)\}}\right]\right\}$$

wherein n represents the sampling time, i represents a web server, $\rho_{tar,i}$ and $q_{tar,i}$ represent performance targets, and $\max\{\rho_{tar,i},\rho_i(n)\}$ and $\max\{q_{tar,i},q_i(n)\}$ represent normalization terms;
generating a random probability number for the admitted web server request; and
determining the particular probability range encompassing the random probability number so as to identify the corresponding web server to which the admitted web server request is to be distributed.

25. An apparatus for adaptively distributing a web server request in a system having a plurality of web servers, the apparatus comprising:
a web server request rejection probability generator for generating a web server request rejection probability based upon performance measures of each of the plurality of web servers;
admission control logic for admitting a web server request if the web server request rejection probability is less than or equal to a predetermined web server request rejection probability threshold, wherein the web server request is admitted before the web server request is sent or transmitted to a web server;
a web server request distribution function generator for generating a web server request distribution function for each of the plurality of web servers based upon performance measures of each of the plurality of web servers, each of the plurality of web servers being assigned a respective probability range based upon each respective web server request distribution function, wherein the web server request distribution function for each of the plurality of web servers is based on tracking functions of the performance measures of each of the plurality of web servers, and wherein the tracking functions of the performance measures of each of the plurality of web servers comprises:

$$\hat{f}_{i,p}(n) = \max\left\{0, \hat{f}_{i,p}(n-1)\left[1 + \frac{\rho_{tar,i} - \rho_i(n)}{\max\{\rho_{tar,i}, \rho_i(n)\}}\right]\right\}$$

$$\hat{f}_{i,q}(n) = \max\left\{0, \hat{f}_{i,q}(n-1)\left[1 + \frac{q_{tar,i} - q_i(n)}{\max\{q_{tar,i}, q_i(n)\}}\right]\right\}$$

wherein n represents the sampling time, i represents a web server, $\rho_{tar,i}$ and $q_{tar,i}$ represent performance targets, and $\max\{\rho_{tar,i},\rho_i(n)\}$ and $\max\{q_{tar,i},q_i(n)\}$ represent normalization terms;
a random number generator for generating a random probability number for the admitted web server request; and
web server request distribution logic for determining the particular probability range encompassing the random probability number so as to identify the corresponding web server to which the admitted web server request is to be distributed.

* * * * *